United States Patent
Song et al.

(10) Patent No.: US 7,494,713 B2
(45) Date of Patent: Feb. 24, 2009

(54) FLOORING MATERIAL

(75) Inventors: Xuefang Song, Osaka (JP); Satoru Matsumoto, Osaka (JP); Tadanori Watanabe, Osaka (JP)

(73) Assignee: Takiron Co., Ltd., Osaka (JP)

( * ) Notice: Subject to any disclaimer, the term of this patent is extended or adjusted under 35 U.S.C. 154(b) by 0 days.

(21) Appl. No.: 11/661,192

(22) PCT Filed: Mar. 3, 2005

(86) PCT No.: PCT/JP2005/004154

§ 371 (c)(1),
(2), (4) Date: Feb. 26, 2007

(87) PCT Pub. No.: WO2006/022042

PCT Pub. Date: Mar. 2, 2006

(65) Prior Publication Data

US 2007/0254175 A1    Nov. 1, 2007

(30) Foreign Application Priority Data

Aug. 25, 2004  (JP) ............... 2004-244625
Nov. 12, 2004  (JP) ............... 2004-328818

(51) Int. Cl.
*B32B 9/04*    (2006.01)
*B32B 27/00*   (2006.01)

(52) U.S. Cl. ............... 428/411.1; 428/424.2; 428/424.4; 428/424.8

(58) Field of Classification Search ............... 428/411.1, 428/424.2, 424.4, 424.8
See application file for complete search history.

(56) References Cited

FOREIGN PATENT DOCUMENTS

| JP | 7-125145 | A | | 5/1995 |
| JP | 8-156192 | A | | 6/1996 |
| JP | 11-13267 | A | | 1/1999 |
| JP | 11-48416 | A | | 2/1999 |
| JP | 2003/147946 | | * | 5/2003 |

* cited by examiner

*Primary Examiner*—Lynda Salvatore
(74) *Attorney, Agent, or Firm*—Sughrue Mion, PLLC (57) ABSTRACT

An object is to provide a flooring material which, when applied, is satisfactory in applicability and conformability to the substrate and which combines all of various properties required of flooring materials, such as nonfouling properties, marring resistance, and flexibility. The flooring material comprises synthetic resin A, which comprises a polyethylene resin and/or an ethylene/α-olefin copolymer resin, synthetic resin B, which comprises a flexible ethylene-based resin, and synthetic resin C, which comprises a thermoplastic elastomer, and has: a face layer formed from a synthetic resin composition obtained by compounding ingredients comprising 30-60 parts by weight of synthetic resin A, 10-50 parts by weight of synthetic resin B, 10-40 parts by weight of synthetic resin C, the sum of the resins A, B, and C being 100 parts by weight, 1-15 parts by weight of a viscosity improver, and 150-500 parts by weight of a filler; and a groundwork layer formed from a synthetic resin composition obtained by compounding ingredients comprising 0-30 parts by weight of synthetic resin A, 30-60 parts by weight of synthetic resin B, 41-60 parts by weight of synthetic resin C, the sum of the resins A, B, and C being 100 parts by weight, 1-15 parts by weight of a viscosity improver, and 150-500 parts by weight of a filler.

11 Claims, 4 Drawing Sheets

11 FACE LAYER
12 GROUNDWORK LAYER
13 BACKING MATERIAL

FLOORING MATERIAL

TECHNICAL FIELD

The present invention relates to a flooring material. In particular, the invention relates to a flooring material which, when installed, is satisfactory in applicability and conformability to the substrate and which combine all of various properties required of a flooring material, such as nonfouling properties, scratch resistance, and flexibility.

BACKGROUND ART

Flooring materials made of a vinyl chloride resin have hitherto been frequently used as indoor flooring materials.

Although these flooring materials made of a vinyl chloride resin have many advantages including ease of bonding and satisfactory workability, they have a drawback that in case of a fire or upon incineration after disposal, the flooring materials emit smoke containing hydrogen chloride gas, which is harmful, and are causative of dioxin generation. Because of this, problems concerning environmental protection have recently been pointed out.

Furthermore, flooring materials made of a vinyl chloride resin have had a problem that since they contain a plasticizer and a stabilizer in large amounts, they are odorous.

Under these circumstances, the present applicant previously directed attention to polypropylene resins which do not contain halogen and proposed a flooring material comprising a synthetic resin composition obtained by incorporating an ethylene/vinyl acetate copolymer resin, calcium carbonate, etc. into a polypropylene resin (see JP-A-7-125145).

Compared to conventional flooring materials made of a polyolefin resin, that flooring material has an advantage of improved bondability. However, the flooring material does not combine all of various properties required of flooring materials, such as nonfouling properties, scratch resistance, and flexibility. In addition, the flooring material proposed has had a problem that it is inferior in workability and conformability to the substrate when installed.

The present applicant further proposed a flooring, material comprising a synthetic resin composition obtained by incorporating a synthetic resin, e.g., an ethylene/vinyl acetate copolymer resin, and an inorganic filler into a polyolefin resin (see JP-A-11-48416).

This flooring material, in a way, has properties concerning flexibility which are required of flooring materials. However, when a highly flexible polymer such as, e.g., an ethylene/vinyl acetate copolymer resin has been incorporated in a large amount so as to improve the flexibility of the flooring material, this flooring material has problems concerning nonfouling properties, scratch resistance, etc. In addition, the problem that the flooring material, when applied, has poor applicability and poor conformability to the substrate remains unsolved.

Incidentally, the workability of a flooring material and the conformability thereof to the substrate during installation are thought to be influenced not only by flexibility but by the degree of resilience.

The incorporation of a large amount of a highly flexible resin such as, e.g., an ethylene/vinyl acetate copolymer resin for improving the flexibility of a flooring material has resulted in impaired workability and impaired conformability due to the resilience possessed by the resin, although this flooring material can have improved flexibility. This technique failed to give a flooring material having the desired properties.

DISCLOSURE OF THE INVENTION

In view of the problems of the flooring materials proposed so far, an object of the invention is to provide a flooring material which, when installed, is satisfactory in workability and conformability to the substrate and which combines all of various properties required of flooring materials, such as nonfouling properties, scratch resistance, and flexibility.

For accomplishing the object, the invention provides, in a first aspect thereof, a flooring material characterized by comprising the following synthetic resin A, synthetic resin B, and synthetic resin C and having: a face layer formed from a synthetic resin composition obtained by compounding ingredients comprising 30-60 parts by weight of synthetic resin A, 10-50 parts by weight of synthetic resin B, 10-40 parts by weight of synthetic resin C, the sum of the resins A, B, and C being 100 parts by weight, 1-15 parts by weight of a viscosity improver, and 150-500 parts by weight of a filler; and a groundwork layer formed from a synthetic resin composition obtained by compounding ingredients comprising 0-30 parts by weight of synthetic resin A, 30-60 parts by weight of synthetic resin B, 41-60 parts by weight of synthetic resin C, the sum of the resins A, B, and C being 100 parts by weight, 1-15 parts by weight of a viscosity improver, and 150-500 parts by weight of a filler.

Synthetic resin A: a resin comprising a polyethylene resin and/or an ethylene·α-olefin copolymer resin Synthetic resin B: a flexible ethylene-based resin comprising one or more members selected from ethylene-vinyl acetate copolymer resins, ethylene-vinyl alcohol copolymer resins, ethylene-acrylic acid copolymer resins, ethylene-methacrylic acid copolymer resins, ethylene-ethyl acrylate copolymer resins, ethylene-methyl methacrylate copolymer resins, ethylene-acrylic ester-maleic anhydride terpolymer resins, and ethylene-acrylic ester-epoxy terpolymer resins.

Synthetic resin C: a thermoplastic elastomer comprising one or more members selected from ethylene/vinyl acetate copolymer thermoplastic elastomers, olefin-based thermoplastic elastomers, and styrene-based thermoplastic elastomers.

In this case, the polyethylene resin as or in synthetic resin A can comprise a metallocene polyethylene resin obtained by polymerization using a metallocene catalyst.

As the viscosity improver can be used a wax and/or a tackifier.

As the filler can be used one or more members selected from calcium carbonate, aluminum hydroxide, talc, quartz powder, Clay, mica, and magnesium hydroxide.

One or more additives selected from stabilizers, plasticizers, colorants, lubricants, release agents, crosslinking agents, antistatic agents, surfactants, flame retardants, blowing agents, and antibacterial/antifungal agents can be added to the synthetic resin compositions.

Furthermore, a sheet-form backing material which is a nonwoven fabric, a woven fabric, or the like may be disposed.

The flooring material according to the first aspect of the invention shows reduced resilience because the synthetic resin compositions constituting the flooring material have been improved, whereby the plasticity necessary for improving workability and conformability to substrates in flooring material installation can be obtained. Simultaneously therewith, various properties required of flooring materials, such as nonfouling properties, marring resistance, and flexibility, can be imparted remarkably.

For accomplishing the same object, the invention provides, in a second aspect thereof, a flooring material characterized by comprising a synthetic resin composition obtained by compounding ingredients comprising, as major ingredients, 25-75 parts by weight of an ethylene-based copolymer resin which does not contain halogen, 75-25 parts by weight of a styrene-based or olefin-based thermoplastic elastomer, the sum of the resin and the elastomer being 100 parts by weight, and 50-300 parts by weight of an inorganic filler, and by having at least one peak of dynamic loss tangent (tan δ) in 10-50° C.

In this case, the ethylene-based copolymer resin which does not contain halogen can comprise one or more members selected from ethylene/vinyl acetate copolymers, ethylene/methyl acrylate copolymers, ethylene/α-olefin copolymers, ethylene/methyl methacrylate copolymers, ethylene/ethyl acrylate copolymers, ethylene/acrylic acid copolymers, ethylene/methacrylic acid copolymers, ethylene/acrylic acid/acrylic ester terpolymers, ethylene/methacrylic acid/acrylic ester terpolymers, and copolymers obtained by incorporating hydroxyl, carboxyl, amino, and epoxy groups into these ethylene-based copolymers which do not contain halogen by various chemical modifications.

As the styrene-based or olefin-based thermoplastic elastomer can be used one or more members selected from styrene/isoprene/styrene block copolymers, styrene/butadiene/styrene block copolymers, styrene/butadiene random copolymers, olefin-based thermoplastic elastomers, products of the hydrogenation of these styrene-based elastomers, incompletely crosslinked olefin-based thermoplastic elastomers, and thermoplastic elastomers obtained by incorporating hydroxyl, carboxyl, amino, and epoxy groups into these thermoplastic elastomers by various chemical modifications.

To the synthetic resin composition can be added 1-10 parts by weight of a wax and/or a tackifier.

The flooring material may comprise an interlayer which comprises a nonwoven fabric or a woven fabric, and a layer of the synthetic resin composition can be disposed on both sides of said interlayer.

Furthermore, the flooring material may have a back layer comprising a nonwoven fabric or a woven fabric.

The flooring material according to the second aspect of the invention has been made to have at least one peak of dynamic loss tangent (tan δ) in 10-50° C., which is a practical use temperature range for flooring materials, by improving the synthetic resin composition constituting the flooring material. This flooring material hence shows reduced resilience, whereby the plasticity necessary for improving workability and conformability to substrates in flooring material installation can be obtained. Simultaneously therewith, various properties required of flooring materials, such as nonfouling properties, scratch resistance, and flexibility, can be imparted remarkably.

BEST MODE FOR CARRYING OUT THE INVENTION

Embodiments of the flooring material according to the first aspect of the invention will be explained below.

Figure 1:
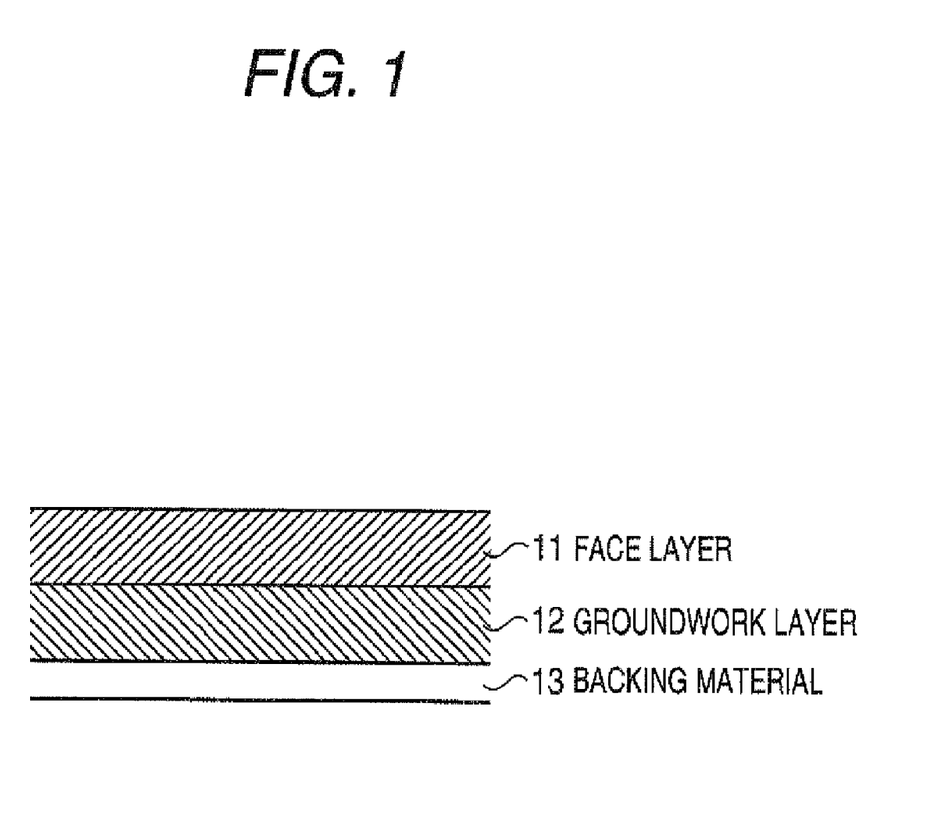
FIG. 1 is a view illustrating one embodiment of the layer constitution of the flooring material according to the first aspect of the invention.

The flooring material according to the first aspect of the invention comprises synthetic resin A which comprises a polyethylene resin and/or an ethylene/α-olefin copolymer resin, synthetic resin B which comprises a flexible ethylene-based resin, and synthetic resin C which comprises a thermoplastic elastomer, and has: a face layer 11 formed from a synthetic resin composition obtained by compounding ingredients comprising 30-60 parts by weight of synthetic resin A, 10-50 parts by weight of synthetic resin B, 10-40 parts by weight of synthetic resin C, the sum of the resins A, B, and C being 100 parts by weight, 1-15 parts by weight of a viscosity improver, and 150-500 parts by weight of a filler; and a groundwork layer 12 formed from a synthetic resin composition obtained by compounding ingredients comprising 0-30 parts by weight of synthetic resin A, 30-60 parts by weight of synthetic resin B, 41-60 parts by weight of synthetic resin C, the sum of the resins A, B, and C being 100 parts by weight, 1-15 parts by weight of a viscosity improver, and 150-500 parts by weight of a filler. According to need, this flooring material has a sheet-form backing material 13 which is a nonwoven fabric, a woven fabric, or the like.

In this case, a polyethylene resin and/or an ethylene/α-olefin copolymer resin can be used as synthetic resin A, and these resins are not particularly limited. However, it is preferred to use a synthetic resin having a density of 0.95 or lower, an MI value of 10 g/10 minor lower, and a flexural rigidity of 5,000 kgf/cm$^2$ (490 MPa) or lower.

Especially preferably, a metallocene polyethylene resin obtained by polymerization using a metallocene catalyst is used as synthetic resin A. Use of this resin can improve the toughness of the flooring material.

As synthetic resin B can be used a flexible ethylene-based resin comprising one or more members selected from ethylene/vinyl acetate copolymer resins (EVA) having a comonomer content lower than 30% by weight, ethylene/vinyl alcohol copolymer resins (EVOH), ethylene/acrylic acid copolymer resins (EAA), ethylene/methacrylic acid copolymer resins, ethylene/ethyl acrylate copolymer resins (EEA), ethylene/methyl methacrylate copolymer resins (EMMA), ethylene/acrylic ester/maleic anhydride terpolymer resins, and ethylene/acrylic ester/epoxy terpolymer resins. Although this flexible ethylene-based resin is not particularly limited, it is preferred to use a synthetic resin having an MI value of 30 g/10 min or lower.

As synthetic resin C can be used a thermoplastic elastomer comprising one or more members selected from ethylene/vinyl acetate copolymer thermoplastic elastomers (EVA) having a comonomer content of 30% by weight or higher, olefin-based thermoplastic elastomers such as olefin-based thermoplastic elastomers of the mere blend type (s-TPO), implantation type olefin-based thermoplastic elastomers (i-TPO), and dynamic vulcanization type olefin-based thermoplastic elastomers (TPV), and styrene-based thermoplastic elastomers such as styrene/butadiene/styrene thermoplastic elastomers (SBS), styrene/isoprene/styrene thermoplastic elastomers (SIS), styrene/ethylene/butylene/styrene thermoplastic elastomers (SEBS), and styrene/ethylene/propylene/styrene thermoplastic elastomers (SEPS). Although the thermoplastic elastomer to be used is not particularly limited, it is preferred to use a synthetic resin having a MI value of 130 g/10 min or lower.

In this case, resins for use as synthetic resin A, synthetic resin B, and synthetic resin C are suitably selected from the respective ranges shown above mainly from the standpoints of abrasion resistance, scratch resistance, nonfouling properties, reduced residual strain, dimensional stability, profitability, etc., mainly from the standpoints of flexibility, filler-accepting properties, reduced residual strain, extrudability, moldability, etc., and mainly from the standpoints of flexibility, filler-accepting properties, low modulus, high stress-relaxation properties, extrudability, moldability, etc., respectively. The viscosity improver is suitably selected from the range shown above mainly from the stand points of compatibilization, filler-accepting properties, low modulus, high stress-relaxation properties, extrudability, etc. The filler is suitably selected from the range shown above from the standpoints of profitability, dimensional stability, reduced residual strain, moldability, etc. Furthermore, various additives are suitably selected from the ranges shown above from the standpoint of various properties required.

As the viscosity improver can be used a wax and/or a tackifier.

As the wax can be used one or more members selected from olefin waxes, olefin-based powdery resins having a MI of 150 or higher, and products of various chemical modifications of these. Use of the wax can improve nonfouling properties and suitability for production.

As the tackifier can be used one or more members selected from petroleum resins, rosin resins, terpene resins, derivatives thereof, and products of various chemical modifications of these. Use of the tackifier can improve compatibility and suitability for production.

As the filler can be used various known fillers. Of these, can be used one or more members selected from calcium carbonate, aluminum hydroxide, talc, quartz powder, clay, mica, and magnesium hydroxide each having an average particle diameter of 10 µm or smaller.

Of those, calcium carbonate, aluminum hydroxide, and talc are preferred because they are inexpensive. In particular, aluminum hydroxide further has an advantage that it can improve the flame retardancy of the flooring material.

A filler whose surface has been chemically treated with, e.g., a silicone, titanate, or aluminate coupling agent for enhancing compatibility with and adhesion to synthetic resins can be used.

The synthetic resin compositions can contain one or more additives selected from stabilizers, plasticizers, colorants, lubricants, release agents, crosslinking agents, antistatic agents, surfactants, flame retardants, blowing agents, and antibacterial/antifungal agents, according to various properties required for the flooring material.

The backing material 13 is not particularly limited. Can be used a backing material comprising, for example, a cheese cloth made of synthetic fiber yarns such as polyester yarns or a spunbonded fabric formed from synthetic fibers such as polyester fibers.

This flooring material has a two-layer structure composed of a face layer 11 and a groundwork layer 12 as a basic structure and optionally has a backing material 13. According to need, the flooring material can have a multilayer structure composed of two or more layers. For example, a protective layer made of a urethane resin, acrylic resin, or the like, having a thickness of about 0.01-0.1 mm may be superposed on and united with the surface of the face layer 11 for the purpose of improving the scratch resistance, nonfouling properties, and other properties of the surface of the flooring material. Furthermore, a nonwoven fabric formed from glass fibers or the like may be interposed between the face layer 11 and the groundwork layer 12 and united with or superposed on and united with the back side of the groundwork layer 12, for the purpose of further preventing the thermal shrinkage of the flooring material.

As described above, in the flooring material according to the first aspect of the invention, resilience can be reduced to obtain plasticity, which is necessary for improving workability and conformability to substrates in flooring material installation, by improving the synthetic resin compositions constituting the flooring material, specifically by incorporating synthetic resin C, which is excellent in flexibility, filler-accepting properties, low modulus, high stress-relaxation properties, etc., in the groundwork layer 12 in a large amount. In addition, various properties required of flooring materials, such as nonfouling properties, scratch resistance, and flexibility, can be remarkably imparted to the flooring material by the improvements.

More specific Examples of the flooring material according to the first aspect of the invention and Comparative Examples are given below.

In Table 1 are shown the makeup examples of the synthetic resin compositions used in the Examples and Comparative Examples.

In these Examples and Comparative Examples, a metallocene polyethylene resin (manufactured by Japan Polyethylene Corp.) obtained by polymerization using a metallocene catalyst was used as synthetic resin A, and an ethylene/vinyl acetate copolymer (EVA) (manufactured by DU PONT-MITSUI POLYCHEMICALS CO., LTD.) was used as synthetic resin B. As synthetic resin C were used an ethylene/vinyl acetate copolymer thermoplastic elastomer(EVA) (manufactured by DU PONT-MITSUI POLYCHEMICALS CO., LTD.), and a styrene/butadiene/styrene thermoplastic elastomer (SBS) (manufactured by Taiwan Kibiton).

Furthermore, a wax (manufactured by Mitsui Chemicals, Inc.) and a rosin resin (rosin ester) (manufactured by Arakawa Chemical Industries, Ltd.) were used as viscosity improver, and calcium carbonate (manufactured by Maruo Calcium Co., Ltd.) was used as a filler.

The synthetic resin compositions shown in Table 1 were used for a face layer 11 (thickness: 1 mm) and a groundwork layer 12 (thickness: 1 mm). The compositions were sheeted with an extruder to obtain the flooring materials shown in Table 2 and FIG. 1.

As a backing material 13 was used a spunbonded fabric formed from polyester fibers.

The flooring materials obtained, which were flooring materials of Examples according to the first aspect of the invention and flooring materials of Comparative Examples, were evaluated for bondability, conformability, and workability by the evaluation methods shown in Table 3. The results thereof are shown in Table 2.

As apparent from Table 2, it could be ascertained that the flooring materials according to the first aspect of the invention can be reduced in resilience and have plasticity, which is necessary for improving workability and conformability to substrates in flooring material installation, and that various properties required of flooring materials, such as nonfouling properties, scratch resistance, and flexibility, can be remarkably imparted thereto.

TABLE 1

| Materials | | Makeup of face-layer composition | | | Makeup of groundwork-layer composition | | | | | | |
|---|---|---|---|---|---|---|---|---|---|---|---|
| | | (1) | (2) | (3) | (4) | (5) | (6) | (7) | (8) | (9) | |
| Synthetic resin A | metallocene PE | 30 | 40 | 10 | 15 | | 25 | 30 | 30 | | 40 |
| Synthetic resin B | EVA | 40 | 60 | 40 | 30 | 55 | 30 | 50 | 30 | | |
| Synthetic resin C | EVA | 20 | | 20 | 15 | 15 | | | | 60 | |
| | SBS | 10 | | 30 | 40 | 30 | 45 | 20 | 70 | | |
| Viscosity improver | wax | 3 | 3 | 3 | | | | | | | |
| | rosin ester | | | | 3 | 3 | 3 | 3 | 3 | 3 | |
| Filler | calcium carbonate | 250 | 250 | 250 | 250 | 250 | 250 | 250 | 250 | 250 | |

TABLE 2

| Structure and performance | Role/Evaluation | Example | | | Comparative Example | | | | | | |
|---|---|---|---|---|---|---|---|---|---|---|---|
| | | 1 | 2 | 3 | 1 | 2 | 3 | 4 | 5 | 6 | 7 |
| Face layer | | (1) | (1) | (1) | (2) | (3) | (1) | (1) | (1) | (1) | (1) |
| Groundwork layer | | (4) | (5) | (6) | (4) | (4) | (7) | (8) | (9) | (4) | (4) |
| Adhesive layer | adhesion of groundwork layer to backing material | present | present | present | present | present | present | present | present | present | absent |
| Backing Material | reduction of linear expansion coefficient; adhesion to adhesive for flooring; buffering of gas swelling by moisture or adhesive | present | present | present | present | present | present | present | present | absent | absent |
| Nonfouling property | acceptable: hue difference ΔH, 15-30 | B | B | B | A | C | B | B | B | B | B |
| Scratch resistance | acceptable: pencil hardness, F-3H | A | A | A | C | A | A | A | A | A | A |
| Flexibility | acceptable: does not crack upon winding around 10-30 mmφ pipe | A | A | A | C | A | C | A | B | B | C |
| Bondability | acceptable: bonding strength, 1.0-2.0 kg/5 cm | A | A | A | A | A | A | A | A | A | B |
| Conformability | acceptable: no noticeble lifting after application | A | A | B | C | C | C | C | C | C | C |

A: satisfactory,
B: acceptable,
C: unacceptable

TABLE 3

| Evaluation item | Test method | Test conditions | Expression of evaluation results |
|---|---|---|---|
| Non-fouling property | in accordance with JIS L 1023-8 | test temperature, 20° C.; number of wearing operations, 200; fouling revolutions, 80; dry revolutions, 20 | hue difference ΔE after dry wiping A: ≦15, B: 15-30, C: ≧30 |
| Scratch resistance | in accordance with JIS K 5600-4 (pencil method; scratch hardness) | | pencil hardness A: ≧4H, B: F-3H, C: ≦HB |
| Flexibility | in accordance with JIS A 1454 (mandrel method) | tested after 5° C. standing for 8 hours or more | A: ≦φ10 mm, B: φ10-30 mm, C: ≧φ30 mm |
| Bond ability | A test piece is allowed to stand at 5° C. for 8 hours or more. An adhesive is applied to asbestos board at 5° C. After 20-min open time, the test piece is applied and press-bonded by rolling a hand roller forward and backward once. | Test piece size: 250 × 50 mm Adhesive for flooring: emulsion type adhesive solvent-based adhesive Press-bonding pressure: 2 kg/50 mm; press-bonding by one forward/backward rolling | bonding strength at 1 week after application A: ≧2.0 kg/5 cm B: 1.0-2.0 kg/5 cm C: ≦1.0 kg/5 cm |
| Conformability | A test piece is wound around a pipe (φ100 mm) and allowed to stand at 5° C. for 8 hours. Next, an adhesive is applied to asbestos board at 5° C. After an open time, the | Test piece size: 250 × 50 mm Adhesive for flooring: emulsion type adhesive Press-bonding pressure: 2 kg/50 mm | A: no lifting after application B: no noticeable lifting C: considerable lifting |

TABLE 3-continued

| Evaluation item | Test method | Test conditions | Expression of evaluation results |
|---|---|---|---|
| | | test piece is applied and press-bonded by rolling a hand roller forward and backward once. | |

Next, embodiments of the flooring material according to the second aspect of the invention will be explained below.

The flooring material according to the second aspect of the invention comprises a synthetic resin composition obtained by compounding ingredients comprising, as major ingredients, 25-75 parts by weight of an ethylene-based copolymer resin which does not contain halogen, 75-25 parts by weight of a styrene-based or olefin-based thermoplastic elastomer, the sum of the resin and the elastomer being 100 parts by weight, and 50-300 parts by weight of an inorganic filler, and has at least one peak of dynamic loss tangent (tan δ) in 10-50° C.

The ethylene-based copolymer resin which does not contain halogen to be used in this case can be one or more members selected from ethylene/vinyl acetate copolymers (EVA), ethylene/methyl acrylate copolymers (EMA), ethylene/α-olefin copolymers, ethylene/methyl methacrylate copolymers (EMMA), ethylene/ethyl acrylate copolymers (EEA), ethylene/acrylic acid copolymers, ethylene/methacrylic acid copolymers, ethylene/acrylic acid/acrylic ester terpolymers, ethylene/methacrylic acid/acrylic ester terpolymers, and copolymers obtained by incorporating hydroxyl, carboxy, amino, and epoxy groups into these ethylene-based copolymers resin which do not contain halogen by various chemical modifications.

As the styrene-based or olefin-based thermoplastic elastomer can be used one or more members selected from styrene/isoprene/styrene block copolymers (SIS), styrene/butadiene/styrene block copolymers (SBS), styrene/butadiene random copolymers (SBR), olefin-based thermoplastic elastomers (TPO), products of the hydrogenation of these styrene-based elastomers, incompletely crosslinked olefin-based thermoplastic elastomers, and thermoplastic elastomers obtained by incorporating hydroxyl, carboxyl, amino, and epoxy groups into these thermoplastic elastomers by various chemical modifications.

As the inorganic filler can be used one or more members selected from calcium carbonate, hard clay, talc, aluminum hydroxide, magnesium hydroxide, and fillers obtained by subjecting these inorganic fillers to various surface treatments.

A wax and/or a tackifier can be added to the synthetic resin composition in an amount of 1-10 parts by weight.

As the wax can be used one or more members selected from polyolefin waxes, olefin-based powdery resins having a MI of 150 or higher, and products of various chemical modifications of these. Use of the wax can improve nonfouling properties and suitability for production.

As the tackifier can be used one or more members selected from petroleum resins, rosin resins, terpene resins, derivatives thereof, and products of various chemical modifications of these. Use of the tackifier can improve compatibility and suitability for production.

The flooring material can comprise: an interlayer comprising a nonwoven or woven fabric formed from inorganic fibers which do not contain halogen or organic fibers, vegetable fibers, or a blend of these fibers; and layers of the synthetic resin composition are disposed respectively on both sides of the interlayer.

In this case, the interlayer comprising a nonwoven fabric or woven fabric is required to have the function of inhibiting the flooring material from expanding or contracting with changing temperature. It is therefore preferred to use in organic fibers, e.g., glass fibers, which have a lower coefficient of linear expansion than organic fibers. More specifically, it is preferred that fibers having a higher modulus at 1% elongation and a lower coefficient of linear expansion in the 10-50° C. range than the layers of the synthetic resin composition should be used for the interlayer interposed between these. For enabling that function to be exhibited with higher certainty, it is preferred to use an interlayer having a higher strength than the layers of the synthetic resin composition which are disposed respectively on both sides of the interlayer.

The flooring material can have a back layer comprising a nonwoven or woven fabric formed from inorganic fibers which do not contain halogen or organic fibers, vegetable fibers, or a blend of these fibers.

In this case, it is preferred that the back layer comprising a nonwoven fabric or woven fabric should have the same function as that required of the interlayer. However, the back layer is not highly required to have that function but is required to have satisfactory bondability to substrates.

Next, more specific Examples of the flooring material according to the second aspect of the invention and Comparative Examples are given below.

In Table 4 are shown the makeup examples of the synthetic resin compositions used in the Examples and Comparative Examples.

In these Examples and Comparative Examples, an ethylene/vinyl acetate copolymer (EVA (EV460, manufactured by DU PONT-MITSUI POLYCHEMICALS CO., LTD.)) and an ethylene/methyl methacrylate copolymer (EMMA (N035C, manufactured BY DU PONT-MITSUI POLYCHEMICALS CO.,LTD.)) were used as ethylene-based copolymer resins which do not contain halogen. As styrene-based or olefin-based thermoplastic elastomers (TPS, TPO), use was made of a styrene/butadiene random copolymer (SBR (L601 and L605, manufactured by Asahi Chemical Industry Co., Ltd.)), a styrene/butadiene/styrene block copolymer (SBS (T420, manufactured by Asahi Chemical Industry Co., Ltd.)), and an olefin-based thermoplastic elastomer (TPO (L704, manufactured by Asahi Kasei Corporation)).

As an inorganic filler was used calcium carbonate (Super 4S, manufactured by Maruo Calcium Co., Ltd.).

In the synthetic resin compositions were further used, as additives, a wax (400P, manufactured by Mitsui Chemicals, Inc.) and a tackifier (rosin resin) (D-125, manufactured by Arakawa Chemical Industries, Ltd.).

The synthetic resin compositions shown in Table 4 were used for an upper layer 21 (thickness, 1 mm) and a lower layer 23 (thickness, 1 mm). The compositions were sheeted with an extruder to obtain the flooring materials shown in Table 5 and FIG. 4.

Figure 4:
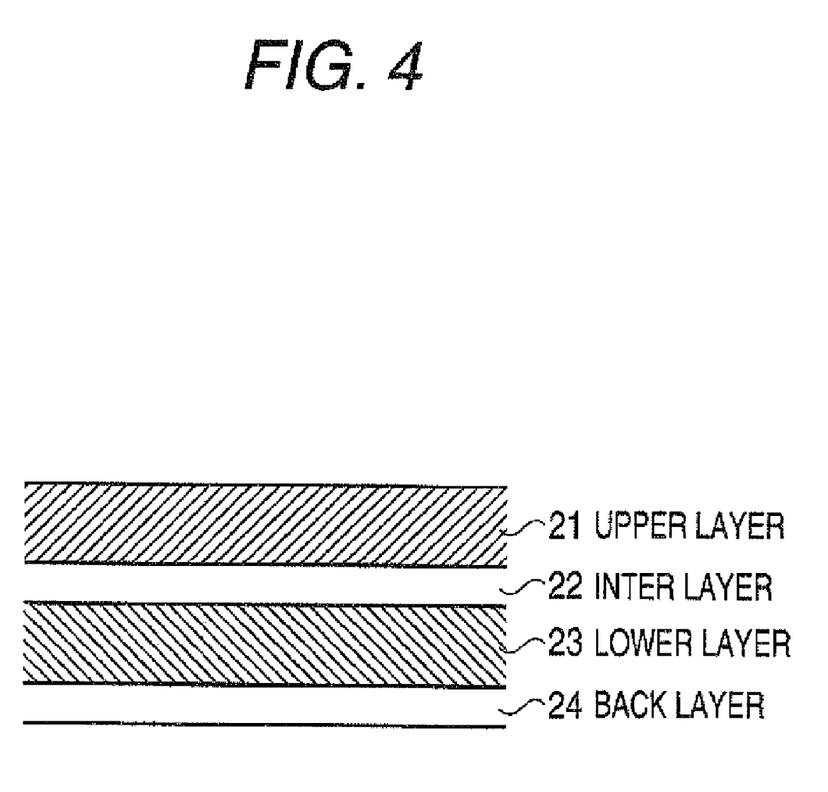
FIG. 4 is a view illustrating one embodiment of the layer constitution of the flooring material according to the second aspect of the invention.

As the interlayer 22 and the back layer 24 was used a nonwoven glass fabric (GF).

Figure 2:
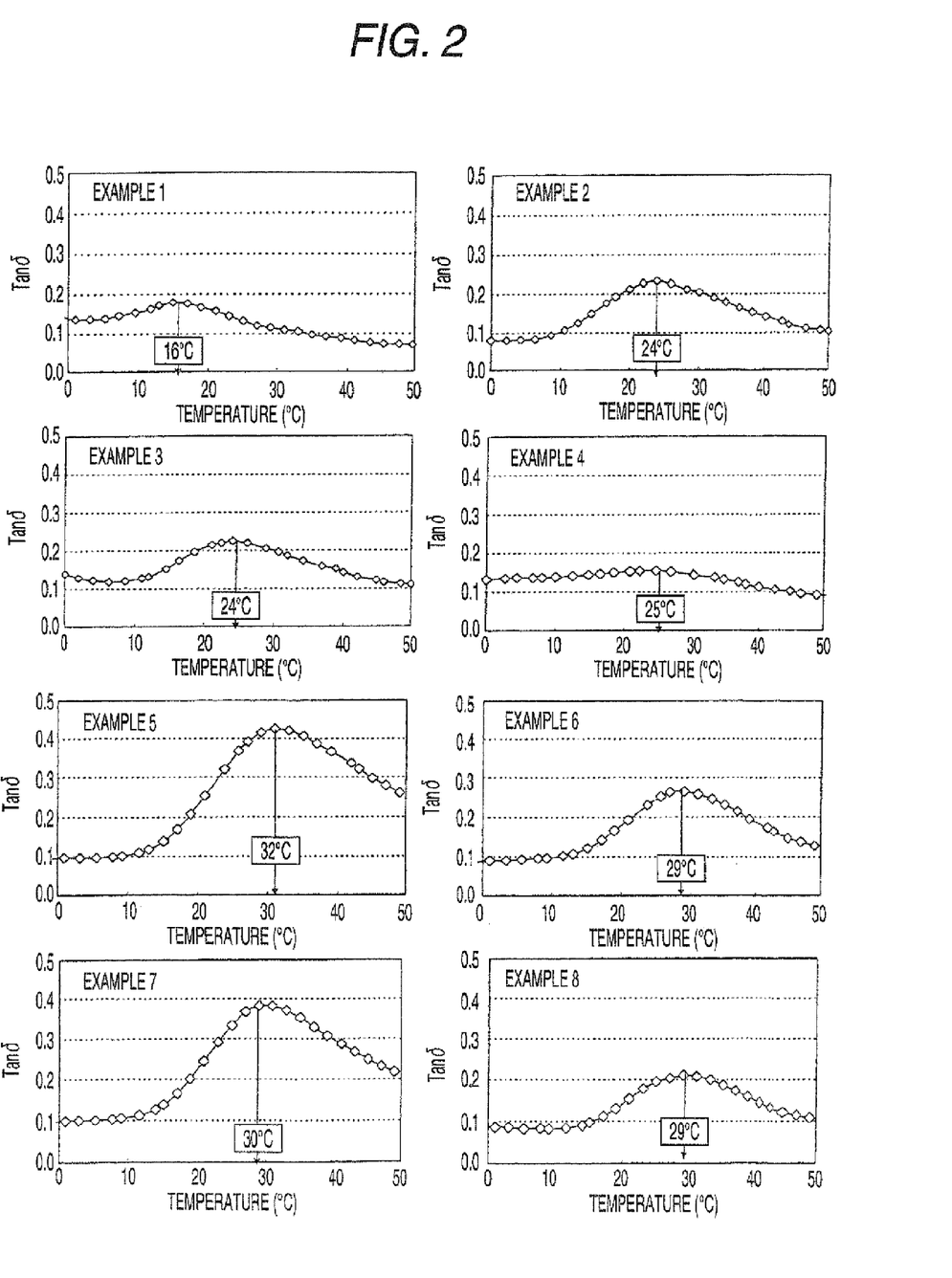
FIG. 2 is graphs showing the relationship between temperature and dynamic loss tangent (tan δ) in the flooring materials of Examples of the second aspect of the invention.
Figure 3:
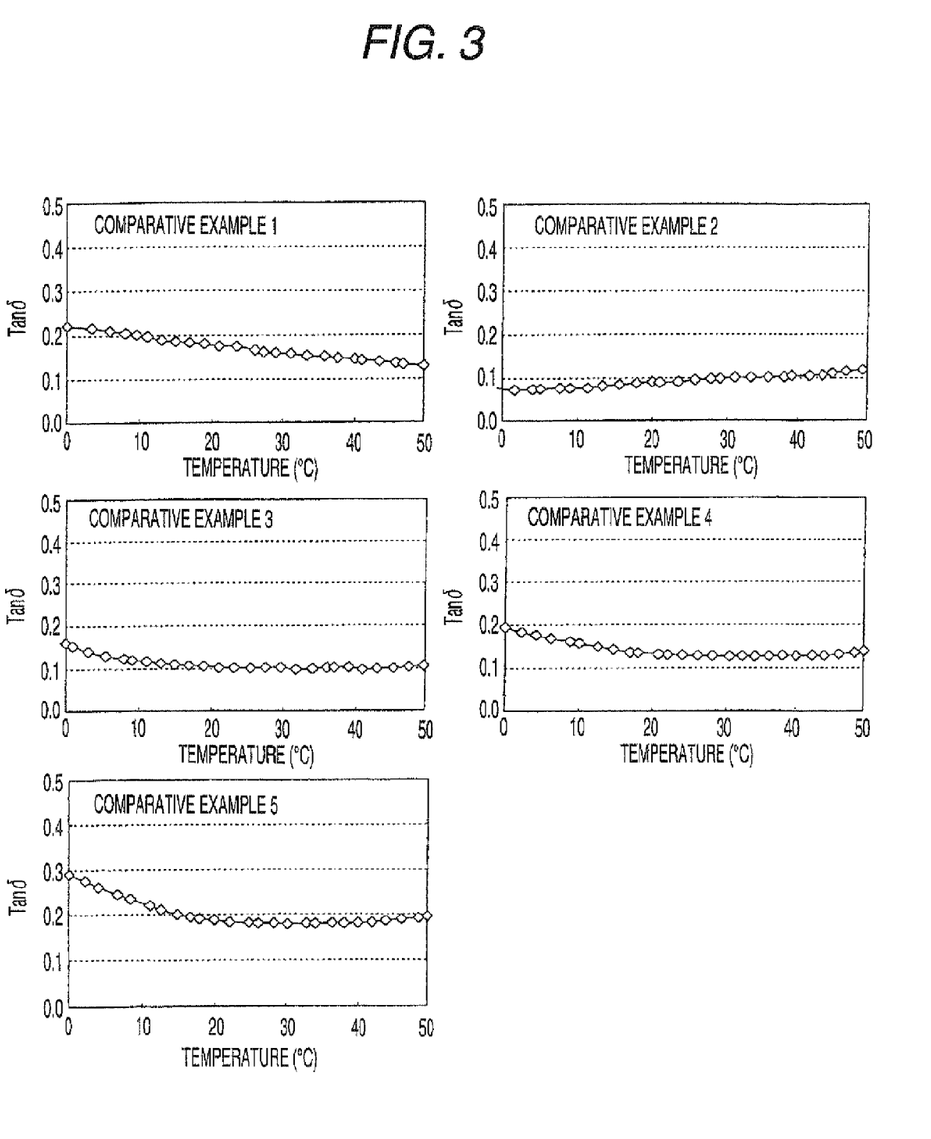
FIG. 3 is graphs showing the relationship between temperature and dynamic loss tangent (tan δ) in the flooring materials of Comparative Examples.

The flooring materials obtained, which were flooring materials of Examples according to the second aspect of the invention and flooring materials of Comparative Examples, were evaluated for the peak temperature (° C.) of dynamic loss tangent (tan δ) and for nonfouling properties, scratch resistance, flexibility, and conformability by the evaluation methods shown in Table 6. The results thereof are shown in Table 5. The relationships between temperature and dynamic loss tangent (tan δ) are shown in FIG. 2 and FIG. 3.

As apparent from Table 5, it could be ascertained that the flooring materials according to the second aspect of the invention can be made to have reduced resilience and to have plasticity, which is necessary for improving workability and conformability to substrates in flooring material installation, by regulating the flooring materials so as to have at least one peak of dynamic loss tangent (tan δ) in 10-50° C., which is a practical use temperature range for flooring materials. It could be further ascertained that various properties required of flooring materials, such as nonfouling properties, scratch resistance, and flexibility, can be remarkably imparted thereto.

TABLE 4

| | Materials | | Makeup examples | | | | | | | | | | | |
|---|---|---|---|---|---|---|---|---|---|---|---|---|---|---|
| | | | (1) | (2) | (3) | (4) | (5) | (6) | (7) | (8) | (9) | (10) | (11) | (12) |
| Makeup Resin | EVA | EV460 | 40 | 40 | 40 | 20 | 60 | | 100 | 40 | 45 | 40 | | 100 |
| | EMAA | N035C | | | | 40 | | | | | | | | |
| TPS | SBR | L601 | 40 | | | | | | | | | | | |
| | | L605 | | 45 | 60 | | | | | 45 | | | | |
| | SBS | T420 | 20 | 15 | | 40 | | 100 | | 15 | 55 | | 100 | |
| TPO | | L704 | | | | | 40 | | | | | 60 | | |
| Wax | | 400P | 3 | 3 | 3 | 3 | 3 | 3 | 3 | | | | | |
| Rosin | | D-125 | | | | | | | | 3 | 3 | 3 | 3 | 3 |
| Filler | calcium carbonate | Super 4S | 100 | 100 | 100 | 100 | 100 | 100 | 100 | 200 | 200 | 200 | 200 | 200 |
| Total | | parts | 203 | 203 | 203 | 203 | 203 | 203 | 203 | 303 | 303 | 303 | 303 | 303 |

TABLE 5

| | | Example | | | | | | | | Comparative Example | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | Remarks |
| Structure | Upper layer, makeup No. | (1) | (2) | (3) | (4) | (3) | (3) | (3) | (3) | (5) | (6) | (6) | (7) | (7) | |
| | Interlayer | GF | GF | GF | GF | | GF | | GF | GF | GF | GF | GF | GF | GF: nonwoven glass fabric |
| | Lower layer, makeup No. | (10) | (2) | (9) | (8) | (8) | (8) | (8) | (8) | (9) | (11) | (12) | (11) | (12) | |
| | Back layer | | | | | | | | GF | GF | | | | | | GF: nonwoven glass fabric |
| Peak temperature of tan δ (° C.) | | 16 | 24 | 24 | 25 | 32 | 29 | 30 | 29 | none | none | none | none | none | In 0-50° C. range |
| | Nonfouling property | B | A | A | A | A | A | A | A | C | B | B | B | B | A: good B: fair C: unacceptable |
| | Scratch resistance | A | A | A | A | A | A | A | A | C | B | B | C | C | A: good B: fair C: unacceptable |
| | Low-temperature flexibility | A | A | A | A | A | A | A | B | B | A | B | B | C | A: good B: fair C: unacceptable |
| | Conformability | A | A | A | B | B | A | A | A | C | C | C | C | C | A: good B: fair C: unacceptable | tan δ: dynamic loss tangent (dynamic loss modulus/dynamic storage modulus)

TABLE 6

| | Evaluation item | Test method | Test conditions | Expression of evaluation results |
|---|---|---|---|---|
| Material | Dynamic loss tangent (tan δ) | dynamic viscoelasticity method (tensile type) | frequency, 100 Hz; amplitude, 3 μm; heating rate, 3° C./min | peak temperature |
| Flooring material performance | Nonfouling property | in accordance with JIS L 1023-8 | hue difference ΔE after dry wiping | A: ≦15, B: 15-30, C: ≧30 |
| | Scratch resistance | in accordance with JIS K 5600-4 (pencil method; scratch hardness) | | A: ≧4H, B: 1-4H, C: ≦1H |
| | Flexibility | in accordance with JIS A | tested after 5° C. standing for | A: ≦φ10 mm, B: φ10-30 mm, |

TABLE 6-continued

| Evaluation item | Test method | Test conditions | Expression of evaluation results |
|---|---|---|---|
| (workability) Conformability | 1454 (mandrel method) Company method: A test piece cut out of sheet is wound around a pipe (φ100 mm) and allowed to stand at 5° C. for 8 hours. Next, an adhesive is applied to asbestos board at 5° C. After an open time, the test piece is applied and press-bonded by rolling a hand roller forward and backward once. | 8 hours or more Test piece size: 250 × 50 mm Adhesive for flooring: emulsion type adhesive Press-bonding pressure: 2 kg/50 mm | C: ≧φ30 mm A: no lifting after application B: no noticeable lifting C: considerable lifting |

The flooring materials according to the first and second aspects of the invention were explained above by reference to Examples thereof. However, the flooring materials according to the first and second aspects of the invention should not be construed as being limited to the constitutions described in the Examples, and the constitutions thereof can be suitably changed as long as these changes are not counter to the spirit of the invention.

While the invention has been described in detail and with reference to specific embodiments thereof, it will be apparent to one skilled in the art that various changes and modifications can be made therein without departing from the spirit and scope thereof.

This application is based on a Japanese patent application filed on Aug. 25, 2004 (Application No. 2004-244625) and a Japanese patent application filed on Nov. 12, 2004 (Application No. 2004-328818), the entire contents thereof being herein incorporated by reference.

INDUSTRIAL APPLICABILITY

The flooring materials according to the first and second aspects of the invention are satisfactory in workability and conformability to substrates in flooring material application. Furthermore, the flooring materials combine all of various properties required of flooring materials, such as nonfouling properties, scratch resistance, and flexibility. Because of this, the flooring materials are usable not only as indoor flooring materials, but also in applications in particularly long flooring materials, in applications in a severe environment, e.g., as outdoor flooring materials.

The invention claimed is:

1. A flooring material which comprises the following synthetic resin A, synthetic resin B, and synthetic resin C and having: a face layer formed from a synthetic resin composition obtained by compounding ingredients comprising 30-60 parts by weight of synthetic resin A, 10-50 parts by weight of synthetic resin B, 10-40 parts by weight of synthetic resin C, the sum of the resins A, B, and C being 100 parts by weight, 1-15 parts by weight of a viscosity improver, and 150-500 parts by weight of a filler; and a groundwork layer formed from a synthetic resin composition obtained by compounding ingredients comprising 0-30 parts by weight of synthetic resin A, 30-60 parts by weight of synthetic resin B, 41-60 parts by weight of synthetic resin C, the sum of the resins A, B, and C being 100 parts by weight, 1-15 parts by weight of a viscosity improver, and 150-500 parts by weight of a filler:

Synthetic resin A: α-resin comprising a polyethylene resin and/or an ethylene/α-olefin copolymer resin;
Synthetic resin B: a flexible ethylene-based resin comprising one or more members selected from ethylene/vinyl acetate copolymer resins, ethylene/vinyl alcohol copolymer resins, ethylene/acrylic acid copolymer resins, ethylene/methacrylic acid copolymer resins, ethylene/ethyl acrylate copolymer resins, ethylene/methyl methacrylate copolymer resins, ethylene/acrylic ester/maleic anhydride terpolymer resins, and ethylene/acrylic ester/epoxy terpolymer resins;
Synthetic resin C: a thermoplastic elastomer comprising one or more members selected from ethylene/vinyl acetate copolymer thermoplastic elastomers, olefin-based thermoplastic elastomers, and styrene-based thermoplastic elastomers.

2. The flooring material according to claim 1, wherein the polyethylene resin in the synthetic resin A comprises a metallocene polyethylene resin obtained by polymerization using a metallocene catalyst.

3. The flooring material according to claim 1 or 2, wherein the viscosity improver comprises a wax and/or a tackifier.

4. The flooring material according to claim 1, wherein the filler comprises one or more members selected from calcium carbonate, aluminum hydroxide, talc, quartz powder, clay, mica, and magnesium hydroxide.

5. The flooring material according to claim 1, wherein the synthetic resin composition comprises one or more additives selected from stabilizers, plasticizers, colorants, lubricants, release agents, crosslinking agents, antistatic agents, surfactants, flame retardants, blowing agents, and antibacterial/antifungal agents.

6. The flooring material according to claim 1, which comprises a sheet-form backing material which is a nonwoven fabric, a woven fabric, or the like.

7. A flooring material which comprises a synthetic resin composition obtained by compounding ingredients comprising, as major ingredients, 25-75 parts by weight of a nonhalogenated ethylene-based copolymer resin, 75-25 parts by weight of a styrene-based thermoplastic elastomer, the sum of the resin and the elastomer being 100 parts by weight, and 50-300 parts by weight of an inorganic filler, wherein the flooring material has at least one peak of dynamic loss tangent (tan δ) in 10-50° C.; and
wherein the nonhalogenated ethylene-based copolymer resin comprises one or more members selected from ethylene/vinyl acetate copolymers, ethylene/methyl acrylate copolymers, ethylene/α-olefin copolymers, ethylene/methyl methacrylate copolymers, ethylene/ethyl acrylate copolymers, ethylene/acrylic acid copolymers, ethylene/methacrylic acid copolymers, ethylene/acrylic acid/acrylic ester terpolymers, ethylene/methacrylic acid/acrylic ester terpolymers, and copolymers obtained by incorporating hydroxyl group, carboxy group, amino group, and epoxy group into the nonhalopenated ethylene-based copolymers.

8. The flooring material according to claim 7, wherein the styrene-based thermoplastic elastomer comprises one or more members selected from styrene/isoprene/styrene block copolymers, styrene/butadiene/styrene block copolymers, styrene/butadiene random copolymers, products of the hydrogenation of the styrene-based elastomers.

9. The flooring material according to claim 7, wherein the synthetic resin composition contains 1-10 parts by weight of a wax and/or a tackifier.

10. The flooring material according to claim 7, which comprises an interlayer which comprises a nonwoven fabric or a woven fabric and layers of said synthetic resin composition are disposed respectively on both sides of the interlayer.

11. The flooring material according to claim 7, which has a back layer comprising a nonwoven fabric or a woven fabric.

* * * * *